Dec. 16, 1930.  C. J. COBERLY  1,785,071
METHOD OF PRODUCING TAPER SLOTTED PIPE
Filed Feb. 4, 1929
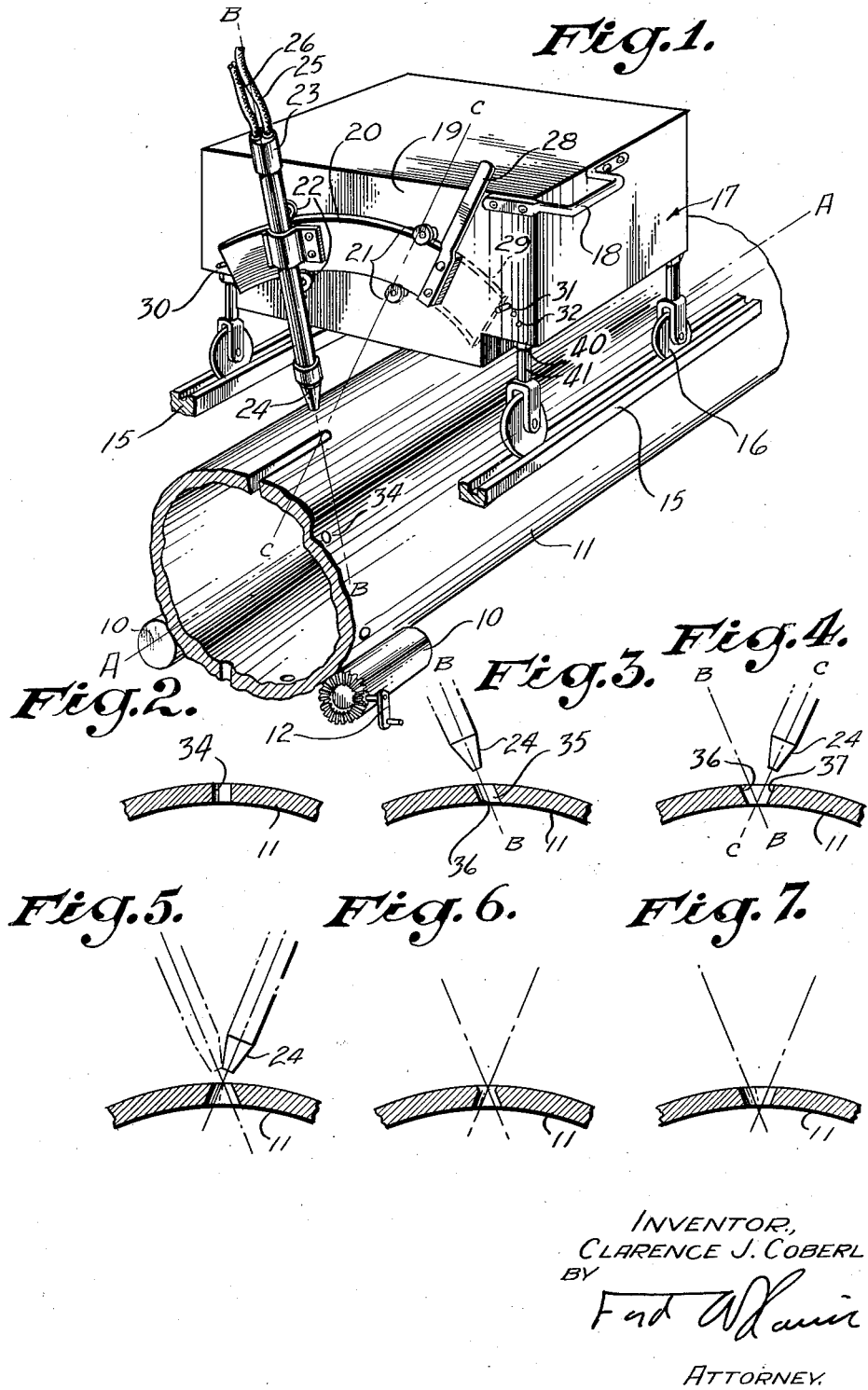
INVENTOR,
CLARENCE J. COBERLY,
BY
ATTORNEY.

Patented Dec. 16, 1930

1,785,071

UNITED STATES PATENT OFFICE

CLARENCE J. COBERLY, OF LOS ANGELES, CALIFORNIA, ASSIGNOR TO KOBE, INCORPORATED, OF LOS ANGELES, CALIFORNIA, A CORPORATION OF CALIFORNIA

METHOD OF PRODUCING TAPER-SLOTTED PIPE

Application filed February 4, 1929. Serial No. 337,493.

My invention relates to slotting devices, and more particularly to a method of and apparatus for slotting pipe.

Slotted pipe is extensively used in the oil-well industry, as well as in other arts. One method of producing this slotted pipe is by the use of an oxyacetylene cutting torch which is moved longitudinally relative to the pipe and in cutting relationship relative thereto. Such a process is disclosed in my Patent No. 1,525,721, granted February 10, 1925.

It is an object of this invention to provide a novel method of cutting slots in metallic bodies, this method being particularly useful in taper-slotting pipe.

My method comprises directing a cutting torch toward the pipe in a non-radial direction, moving the torch longitudinally relative to the pipe, transversely moving the torch into a second non-radial position, and moving the torch longitudinally relative to the pipe in a reverse direction. In this way various types of tapered slots may be formed, depending upon the amount of transverse movement of the cutting torch, the distance between the torch and the pipe, and the shape of the cutting jet.

It is an object of this invention to provide a novel method of slotting pipe by longitudinally moving a cutting torch relative to the pipe, shifting the position of the torch, and again moving the torch relative to the pipe in a manner to successively form primary and secondary walls of the slot.

Another object of this invention is to provide a novel apparatus for carrying out my method.

Further objects and advantages of my invention will be made evident hereinafter.

Referring to the drawings,—

Fig. 1 is a diagrammatic perspective view illustrating the relative positions of the torch and pipe.

Fig. 2 is a cross-sectional view indicating the hole which is formed prior to the cutting of the slot.

Fig. 3 is a diagrammatic view illustrating a primary position of the torch relative to the pipe.

Fig. 4 is a view similar to Fig. 3, illustrating a secondary position of the torch relative to the pipe.

Figs. 5, 6, and 7 are diagrammatic views illustrating different types of slots which may be cut by changing the point of intersection of the torch axes when in primary and secondary positions relative to the walls of the pipe.

Referring particularly to Fig. 1, I have illustrated a pair of rolls 10 adapted to support a pipe 11. A handle 12 is geared or otherwise connected to at least one of the rolls 10 and provides a means for turning this roll. The pipe 11 is adapted to turn about its axis A—A due to its frictional engagement with the roll 10.

Tracks 15 extend parallel to the axis A—A and are adapted to guide wheels 16 of a carriage 17. The carriage may be manually moved by a handle 18, or may be power driven or automatically moved by any reciprocating means known in the art.

Adapted to slide adjacent a face 19 of the carriage 17 is an arcuate member 20 positioned between pairs of rolls 21 and 22 so as to be movable in a plane transverse to that of the axis A—A of the pipe. Secured to the member 20 is a cutting torch 23 of suitable design, this torch having a tip 24 from which a cutting flame issues, this flame being directed in cutting relationship relative to the pipe 11. The torch 23 is preferably of the oxyacetylene type, being supplied with suitable gases through an oxygen hose 25 and an acetylene hose 26. One type of cutting torch uses an oxyacetylene flame to heat the metal and impinges a high velocity jet of pure hydrogen on the heated surface to do the actual cutting. However, I am not limited to this type of cutting torch.

The torch 23 may be moved transversely by means of a handle 28 secured to the member 20, or by any other type of mechanical or electrical device for moving the member 20 from its full line position, shown in Fig. 1, into its dotted line position 29 whether this device is manually or automatically controlled. Apparatus for mechanically moving the torch transversely is shown and described in my Patent No. 1,554,406 granted September 22, 1925. This full line position is determined by a pin 30, while the dotted line position is determined by a pin 31, each of these pins resting in any one of a series of openings 32 in the carriage 17, thus permitting ready adjustment of the amount of transverse movement of the torch 23.

In carrying out my method, I prefer to first form a series of holes 34 in the pipe 11, these holes being formed so as to define the ends of the slots to be cut. The holes 34 may be formed either by drilling, punching, or by the use of a suitable torch, the particular method of forming these holes being no part of this invention.

With the cutting torch in the position shown in Fig. 1, the carriage 17 is moved into a position so that the flame issuing therefrom passes through one of the openings 34. The flame from the torch thus passes through this opening in a direction indicated best in Fig. 3, the position of the torch at this time being termed a primary one. It should be clear that the torch at this instant is non-radial with respect to the axis of the pipe 11, so that the axis B—B of the torch at this time does not intersect the axis A—A of the pipe.

The carriage 17 is then moved forward, thus causing the torch to cut a primary slot 35, having substantially parallel walls, one of these walls being termed a primary wall 36 and being best illustrated in Fig. 3. When the desired length of slot has been cut, the member 20 is moved into its dotted line position 29, thus moving the torch 23 until its axis lies along the line C—C. The carriage 17 is then reversed, and the torch cuts a secondary wall 37. This movement of the carriage continues until the flame is again adjacent the hole 34.

At this time the supply of the oxygen forming the cutting jet may be cut off to prevent a cutting of the pipe 11 while this pipe is turned about its axis by means of the rolls 10 and handle 12 until another hole 34 is in the path of the cutting torch, after which the process is repeated.

It should thus be apparent that I have formed the primary and secondary walls 36 and 37 during successive movements of the carriage 17, the wall 36 being formed on the forward movement of the carriage and the wall 37 being formed on the reverse movement. The resulting slot is clearly shown in Fig. 4. The shape of this slot may be varied by changing the point of intersection of the axes B—B and C—C relative to the pipe 11. If this point of intersection is raised, a slot such as shown in Fig. 5 will be obtained, this slot being of greater width in the inside than it is on the outside thereof.

This type of slot is very well adapted to use in the oil-well drilling and pumping industry. By forming the point of intersection as shown in Fig. 6, it is possible to make a double tapered slot. Similarly, by lowering the point of intersection of these axes, as illustrated in Fig. 7 to a point inside the pipe, it is possible to cut a wide slot having a wider opening at the outer surface of the pipe than at the inner surface. This change in position of the point of intersection of the axes B—B and C—C is accomplished by changing the distance between the tip 24 of the torch and the pipe 11. This may conveniently be accomplished by nuts 40 threaded to legs 41 of the carriage 17, or by any other suitable means.

The angle of the walls 36 and 37 may be varied by changing the amount of movement of the member 20, this being accomplished by shifting the pins 30 and 31 into the desired openings, or otherwise adjusting the maximum positions of the cutting torch. Furthermore, the shape of the opening may be varied by changing the shape of the cutting jet produced by the torch 23.

It should, of course, be understood that my invention comprises any means for relatively moving the torch 23 and the pipe 11. It is entirely possible, and in some instances desirable, to longitudinally move the pipe 11 along its axis A—A rather than to provide a movable carriage 17. Similarly, both the torch and carriage might be moved simultaneously.

Thus, in speaking of moving the torch relative to the pipe 11, I do not desire to be limited to the use of a moving torch and a stationary pipe, but desire this term to be interpreted in its broadest sense to cover any means for relatively moving the pipe 11 and torch 23.

Furthermore, it is within the scope of this invention to make the shifting of the member 20 from its full line position into its dotted line position an entirely automatic feature, this shifting taking place after the carriage 17 has moved a definite predetermined distance. This might easily be accomplished by a switch operated as a function of the position of the carriage and wired in the electrical circuit of a device for moving the torch transversely, my aforesaid Patent No. 1,554,406 illustrating a motor for moving the torch in the circuit of which the switch might be placed.

Similarly, any means for rotating the pipe 11 about its axis A—A may be utilized instead of the rolls 10 and any manually or automatically operated means for rotating the rolls 10 may be utilized instead of the handle 12 which has been shown only for the purpose of illustration.

I claim as my invention:

1. A method of cutting slots in a body by the use of a cutting torch, which comprises: moving said torch relative to said body a distance equal to the length of the desired slot in a manner to form a primary wall of said slot; and reversing the movement of said torch relative to said body to form a secondary wall of said slot.

2. A method of cutting slots in a body by the use of a cutting torch, which comprises: forming a hole in said body, said hole defining one end of said slot; directing said torch through said hole; moving said torch relative to said body a distance equal to the desired length of said slot in a manner to form a primary wall of said slot; and moving said torch relative to said body to a position adjacent said hole to form a secondary wall of said slot.

3. A method of taper-slotting pipe, which comprises: forming a hole in said pipe; directing the flame of a cutting torch through said hole in a non-radial direction; moving said torch relative to said pipe in a direction parallel to the axis of said pipe; shifting said torch into a different non-radial position; and moving said torch relative to said pipe in a direction parallel to the axis of said pipe.

4. A method of taper-slotting pipe, which comprises: directing the flame of a cutting torch in a primary non-radial direction relative to the axis of said pipe; moving said flame longitudinally along said pipe in a forward direction; moving said cutting torch in a plane intersected by said axis of said pipe to a secondary non-radial direction and moving said flame in a reverse direction.

5. A method as defined in claim 4 in which the angle between the axis of said torch and the axis of said pipe when said torch points in said primary direction is equal to the angle between the axis of said torch and the axis of said pipe when said torch points in a secondary direction, said angles being measured in the plane of movement of said torch.

6. A method of cutting slots in a body by the use of a cutting torch, which comprises: holding said torch in a certain angular position relative to the body to be cut; moving said torch relative to said body a distance equal to the length of the desired slot to form a primary wall of said slot; adjusting the lateral position of the torch; and moving said torch in the opposite direction to form a secondary wall of said slot.

7. A method of cutting slots in a body by the use of a cutting torch, which comprises: holding said torch in a certain angular position relative to a body to be cut; moving said torch relative to the body to form one side of the slot; adjusting the angular position of said torch; and moving said torch in the opposite direction to form the other side of the slot.

8. A method of cutting slots in a body by the use of a cutting torch, which comprises: holding said torch in a certain angular position relative to a body to be cut; moving said torch relative to said body; adjusting the lateral position of said torch; and moving said torch in the opposite direction.

In testimony whereof, I have hereunto set my hand at Los Angeles, California, this 30th day of January, 1929.

CLARENCE J. COBERLY.